United States Patent
Gonze et al.

(10) Patent No.: US 8,104,270 B2
(45) Date of Patent: Jan. 31, 2012

(54) ELECTRICALLY HEATED PARTICULATE FILTER PREPARATION METHODS AND SYSTEMS

(75) Inventors: Eugene V. Gonze, Pinckney, MI (US); Michael J. Paratore, Jr., Howell, MI (US)

(73) Assignee: GL Global Technology Operations LLC

( * ) Notice: Subject to any disclaimer, the term of this patent is extended or adjusted under 35 U.S.C. 154(b) by 974 days.

(21) Appl. No.: 11/803,678

(22) Filed: May 15, 2007

(65) Prior Publication Data

US 2008/0282677 A1    Nov. 20, 2008

(51) Int. Cl.
*F01N 3/00* (2006.01)

(52) U.S. Cl. .......................................... 60/295; 60/286

(58) Field of Classification Search .............. 60/295
See application file for complete search history.

(56) References Cited

U.S. PATENT DOCUMENTS

| | | | |
|---|---|---|---|
| 4,505,726 A | 3/1985 | Takeuchi | |
| 4,516,993 A | 5/1985 | Takeuchi | |
| 4,685,290 A * | 8/1987 | Kamiya et al. | 60/274 |
| 4,730,454 A | 3/1988 | Pischinger et al. | |
| 6,770,116 B2 * | 8/2004 | Kojima | 95/14 |
| 6,948,311 B2 * | 9/2005 | Schaller et al. | 60/286 |
| 6,973,778 B2 * | 12/2005 | Kondou et al. | 60/295 |
| 7,013,638 B2 * | 3/2006 | Hiranuma et al. | 60/286 |
| 2004/0000139 A1 * | 1/2004 | Kawashima et al. | 60/295 |
| 2004/0244366 A1 | 12/2004 | Hiranuma et al. | |
| 2005/0166580 A1 * | 8/2005 | Pfaeffle et al. | 60/295 |
| 2006/0144038 A1 * | 7/2006 | Miura | 60/286 |
| 2007/0056273 A1 * | 3/2007 | Wills | 60/297 |

FOREIGN PATENT DOCUMENTS

CN    1532381 A    9/2004

\* cited by examiner

*Primary Examiner* — Thomas Denion
*Assistant Examiner* — Jason Shanske (57) ABSTRACT

A control system that controls regeneration of a particulate filter is provided. The system generally includes a fuel control module that controls injection of fuel into exhaust that passes through the particulate filter. A regeneration module controls current to the particulate filter to initiate regeneration after the fuel has been injected into the exhaust.

12 Claims, 8 Drawing Sheets

ELECTRICALLY HEATED PARTICULATE FILTER PREPARATION METHODS AND SYSTEMS

STATEMENT OF GOVERNMENT RIGHTS

This invention was produced pursuant to U.S. Government Contract No. DE-FC-04-03 AL67635 with the Department of Energy (DoE). The U.S. Government has certain rights in this invention.

FIELD

The present disclosure relates to methods and systems for heating particulate filters.

BACKGROUND

The statements in this section merely provide background information related to the present disclosure and may not constitute prior art.

Diesel engines typically have higher efficiency than gasoline engines due to an increased compression ratio and a higher energy density of diesel fuel. A diesel combustion cycle produces particulates that are typically filtered from diesel exhaust by a particulate filter (PF) that is disposed in the exhaust stream. Over time, the PF becomes full and the trapped diesel particulates must be removed. During regeneration, the diesel particulates are burned within the PF.

Some regeneration methods ignite particulate matter present on the front of the PF via a front surface heater. Regeneration of particulate matter present inside the PF is then achieved using the heat generated by combustion of particulate matter present near the heated face of the PF or by the heated exhaust passing through the PF. In some cases, the combustion of the particulate matter within the PF can be extinguished before regeneration has completed.

SUMMARY

Accordingly, a control system that controls regeneration of a particulate filter is provided. The system generally includes a fuel control module that controls injection of fuel into exhaust that passes through the particulate filter. A regeneration module controls current to the particulate filter to initiate regeneration after the fuel has been injected into the exhaust.

In other features, a method of controlling regeneration of a particulate filter is provided. The method generally includes: injecting fuel into exhaust that passes through the particulate filter; and controlling current to the particulate filter to initiate regeneration after the fuel has been injected into the exhaust.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features. As used herein, the term module refers to an application specific integrated circuit (ASIC), an electronic circuit, a processor (shared, dedicated, or group) and memory that executes one or more software or firmware programs, a combinational logic circuit, and/or other suitable components that provide the described functionality.

Figure 1:
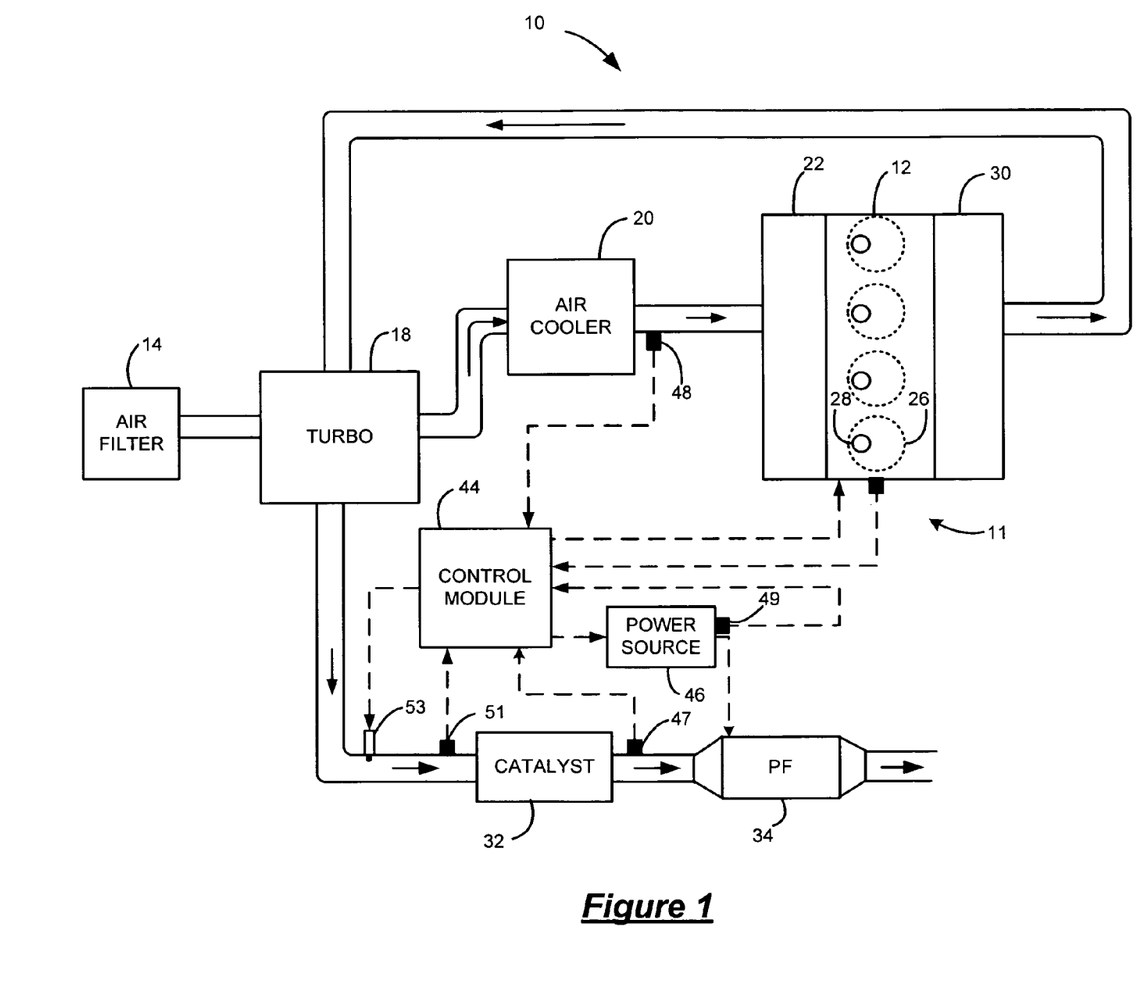
FIG. 1 is a functional block diagram of an exemplary vehicle including a particulate filter and a particulate filter preparation system according to various aspects of the present disclosure.

Referring now to FIG. 1, an exemplary vehicle 10 including an exemplary diesel engine system 11 is illustrated in accordance with various aspects of the present teachings. It is appreciated that the diesel engine system 11 is merely exemplary in nature and that the particulate filter preparation system described herein can be implemented in various engine systems implementing a particulate filter. Such engine systems may include, but are not limited to, gasoline direct injection engine systems and homogeneous charge compression ignition engine systems. For ease of the discussion, the disclosure will be discussed in the context of a diesel engine system.

A turbocharged diesel engine system 11 includes an engine 12 that combusts an air and fuel mixture to produce drive torque. Air enters the system by passing through an air filter 14. Air passes through the air filter 14 and is drawn into a turbocharger 18. The turbocharger 18 compresses the fresh air entering the system 10. The greater the compression of the air generally, the greater the output of the engine 12. Compressed air then passes through an air cooler 20 before entering into an intake manifold 22.

Air within the intake manifold 22 is distributed into cylinders 26. Although four cylinders 26 are illustrated, it is appreciated that the systems and methods of the present disclosure can be implemented in engines having a plurality of cylinders including, but not limited to, 2, 3, 4, 5, 6, 8, 10 and 12 cylinders. It is also appreciated that the systems and methods of the present disclosure can be implemented in a v-type cylinder configuration. Fuel is injected into the cylinders 26 by fuel injectors 28. Heat from the compressed air ignites the air/fuel mixture. Combustion of the air/fuel mixture creates exhaust. Exhaust exits the cylinders 26 into the exhaust system.

The exhaust system includes an exhaust manifold 30, a diesel oxidation catalyst (DOC) 32, and a particulate filter (PF) 34. Optionally, an EGR valve (not shown) re-circulates a portion of the exhaust back into the intake manifold 22. The remainder of the exhaust is directed into the turbocharger 18 to drive a turbine. The turbine facilitates the compression of the fresh air received from the air filter 14. Exhaust flows from the turbocharger 18 through the DOC 32 and the PF 34. The DOC 32 oxidizes the exhaust based on the post combustion air/fuel ratio. The amount of oxidation increases the temperature of the exhaust. The PF 34 receives exhaust from the DOC 32 and filters any particulates present in the exhaust.

A control module 44 controls the engine and PF regeneration based on various sensed and/or modeled information. More specifically, the control module 44 estimates loading of the PF 34. When the estimated loading achieves a threshold level (e.g., 5 grams/liter of particulate matter) and the exhaust flow rate is within a desired range, current is controlled to the PF 34 via a power source 46 to initiate the regeneration process. The duration of the regeneration process varies based upon the amount of particulate matter within the PF 34. It is anticipated, that the regeneration process can last between 1-6 minutes. Current is only applied, however, during an initial portion of the regeneration process. More specifically, the electric energy heats the face of the PF 34 for a threshold period (e.g., 1-2 minutes). Exhaust passing through the front face is heated. The remainder of the regeneration process is achieved using the heat generated by combustion of particulate matter present near the heated face of the PF 34 or by the heated exhaust passing through the PF 34.

In some cases, the combustion of the particulate matter within the PF 34 is extinguished by certain engine operating conditions. For example, the regeneration can be extinguished by an engine acceleration event. To prevent such extinguishment, the control module 44 pretreats the PF 34 with fuel based on sensor signals and/or modeled data and the particulate filter preparation methods and systems of the present disclosure. The pretreatment of fuel increases the heat levels of combustion in the PF 34 to prevent the extinguishment of the combustion.

In various embodiments, an exhaust temperature sensor 47 generates an exhaust temperature signal based on a temperature of the exhaust. A mass airflow sensor 48 generates an exhaust air signal based on air entering or exiting the engine 12. A current and/or voltage sensor 49 generates a current and/or voltage signal based on the voltage and/or current supplied by the power source 46 to the PF 34. An oxygen sensor 51 generates an oxygen level signal based on a level of oxygen in the exhaust. In various embodiments, the control module 44 receives the signals and pretreats the PF 34 with fuel while controlling a combustion temperature such that the heat is not excessive. The pretreatment of fuel can be achieved, for example, by injecting fuel in the exhaust after the combustion cycle via, for example, the fuel injector 28 or a post fuel injector 53 that injects fuel into the exhaust.

Figure 2:
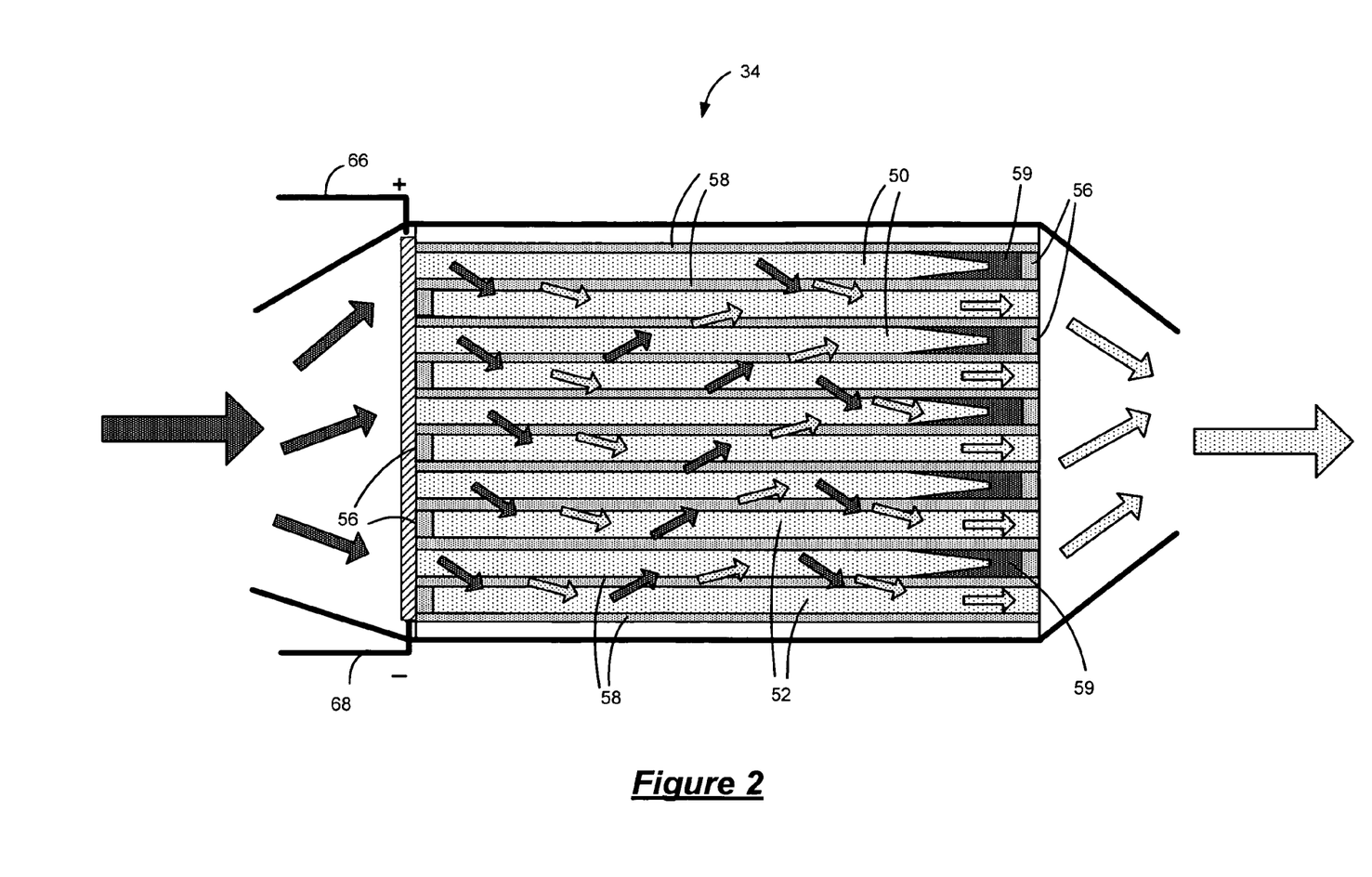
FIG. 2 is a cross-sectional view of an exemplary wall-flow monolith particulate filter.

With particular reference to FIG. 2, the PF 34 is preferably a monolith particulate trap and includes alternating closed cells/channels 50 and opened cells/channels 52. The cells/channels 50, 52 are typically square cross-sections, running axially through the part. Walls 58 of the PF 34 are preferably comprised of a porous ceramic honeycomb wall of cordierite material. It is appreciated that any ceramic comb material is considered within the scope of the present disclosure. Adjacent channels are alternatively plugged at each end as shown at 56. This forces the diesel aerosol through the porous substrate walls which act as a mechanical filter. Particulate matter is deposited within the closed channels 50 and exhaust exits through the opened channels 52. Particles 59 flow into the PF 34 and are trapped therein.

For regeneration purposes, a grid 64 including an electrically resistive material is attached to the front exterior surface referred to as the front face of the PF 34. Current is supplied to the resistive material to generate thermal energy. It is appreciated that thick film heating technology may be used to attach the grid 64 to the PF 34. For example, a heating material such as Silver or Nichrome may be coated then etched or applied with a mask to the front face of the PF 34. In various other embodiments, the grid 64 is composed of electrically resistive material such as stainless steel and attached to the PF 34 using an adhesive or press fit to the PF 34.

Figure 3:
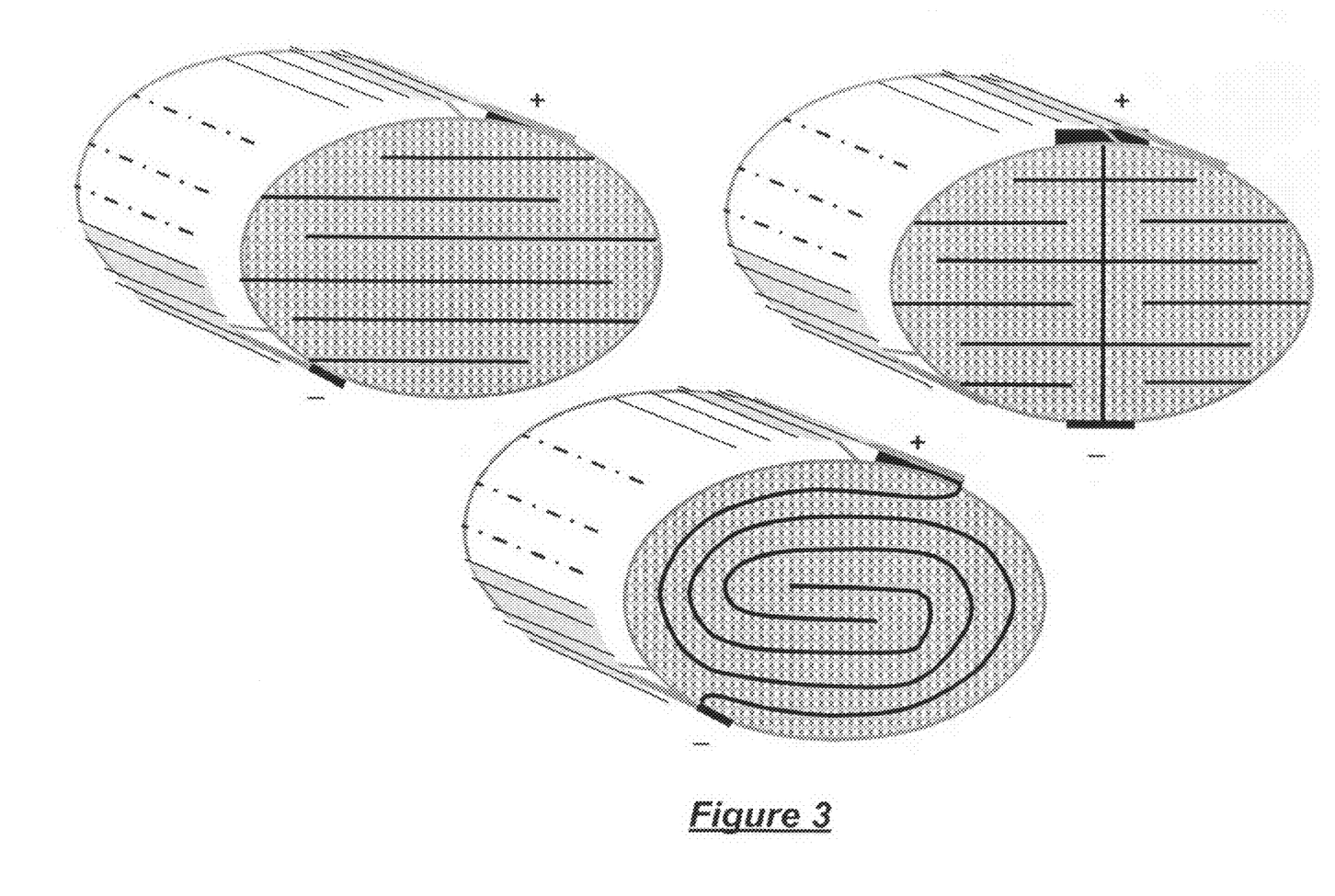
FIG. 3 includes perspective views of exemplary front faces of particulate filters illustrating various patterns of resistive paths.
Figure 4:
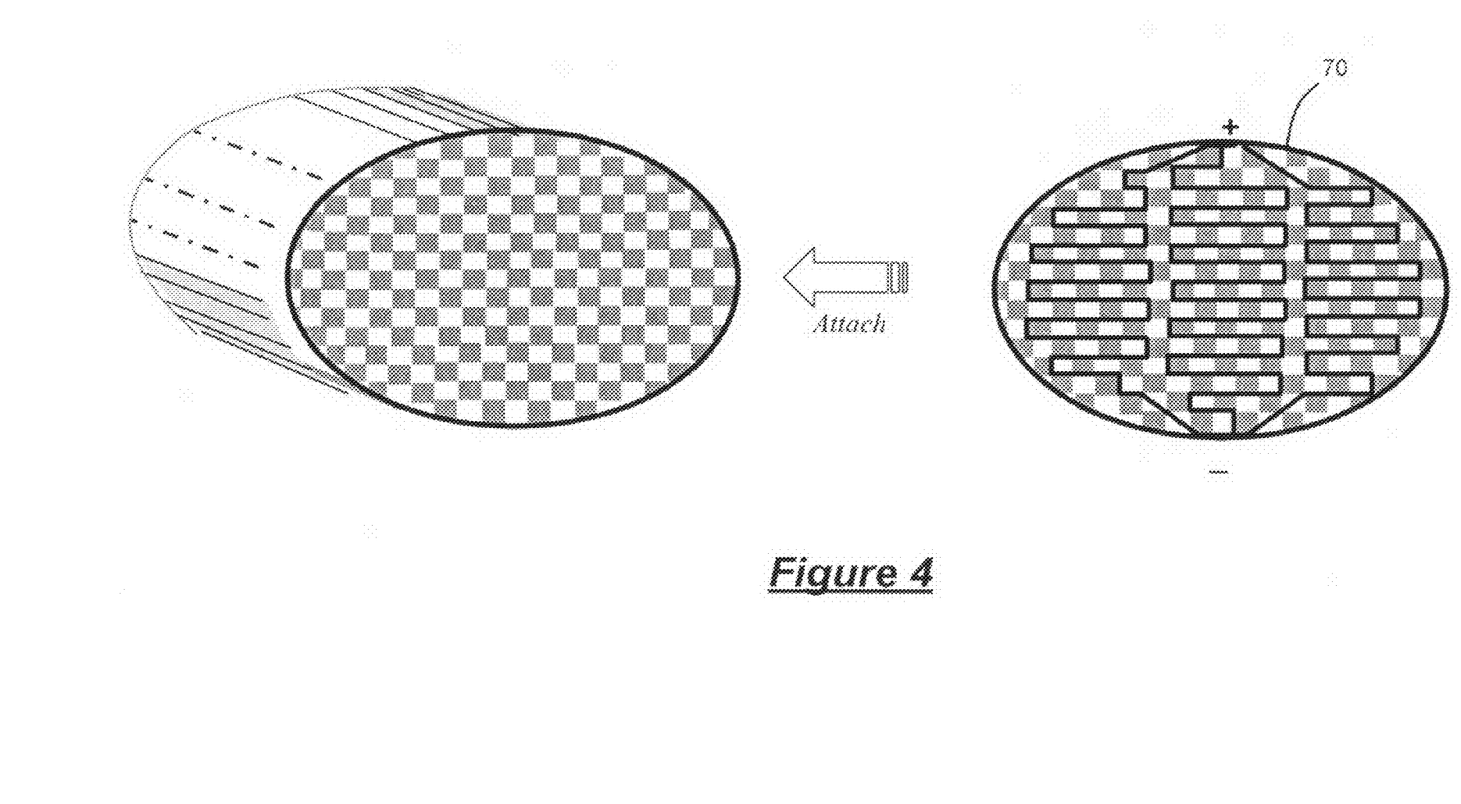
FIG. 4 is a perspective view of a front face of an exemplary particulate filter and a heater insert.

It is also appreciated that the resistive material may be applied in various single or multi-path patterns as shown in FIG. 3. Segments of resistive material can be removed to generate the pathways. In various embodiments a perforated heater insert 70 as shown in FIG. 4 may be attached to the front face of the PF 34. In any of the above mentioned embodiments, exhaust passing through the PF 34 carries thermal energy generated at the front face of the PF 34 a short distance down the channels 50, 52. The increased thermal energy ignites particulate matter present near the inlet of the PF 34. The heat generated from the combustion of the particulates is then directed through the PF 34 to induce combustion of the remaining particulates within the PF 34.

Figure 5:
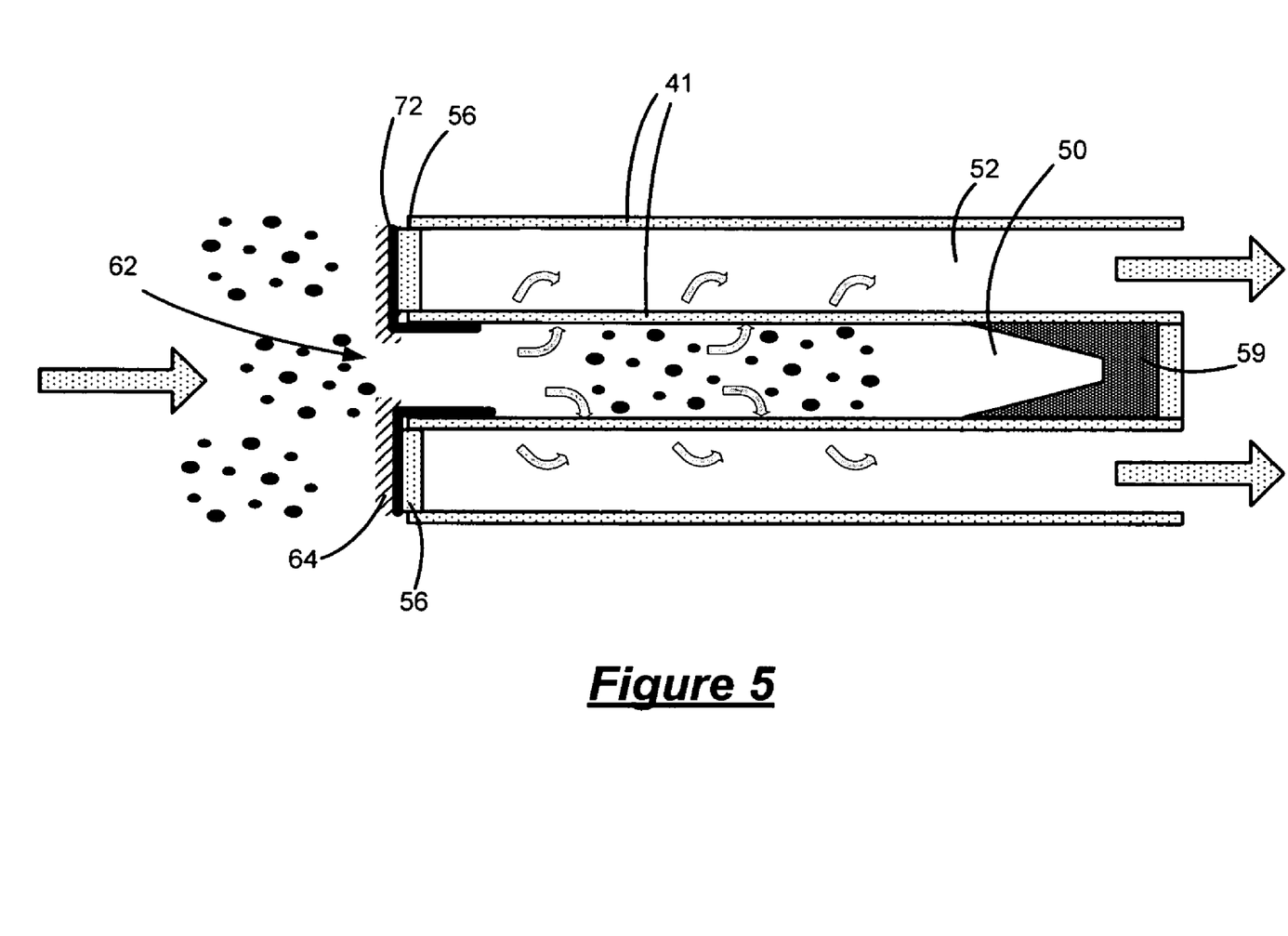
FIG. 5 is a cross-sectional view of a portion of the exemplary particulate filter of FIG. 2 including a conductive coating.

With particular reference to FIG. 5, a thermally conductive coating 72 can be additionally applied at the inlets 62 of the channels 50, 52. The coating 72 can extend a short distance down the opened ends of the closed channels 50. In various embodiments, the conductive coating extends within an inch of the front face of the PF 34. The resistive material of the grid 64 contacts the conductive coating 72. Thermal energy is transferred to the conductive coating 72 when electrical energy passes through the resistive material. Heat from the conductive coating 72 ignites particulate matter present near the inlet of the PF 34.

Figure 6:
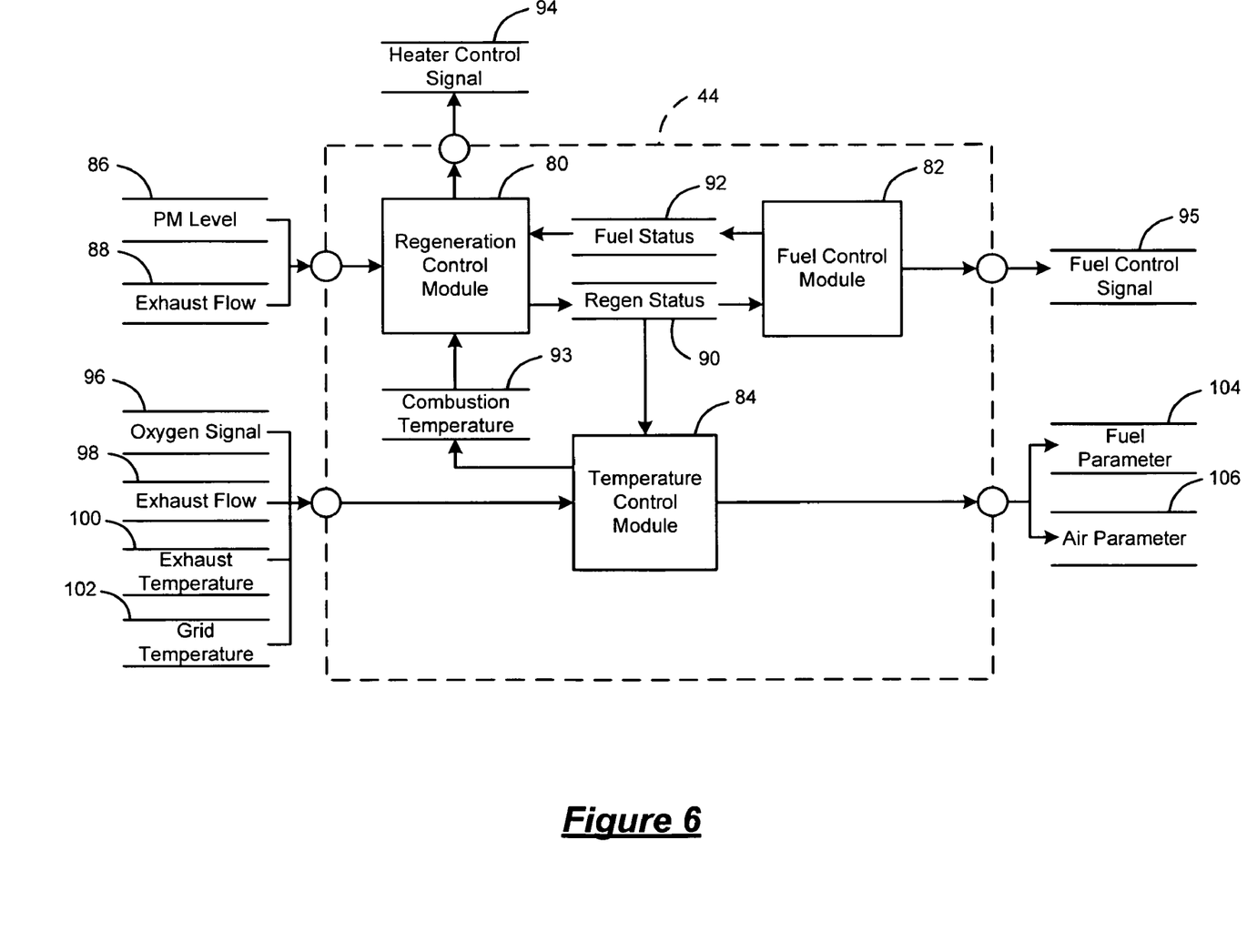
FIG. 6 is a dataflow diagram illustrating and exemplary particulate filter preparation system according to various aspects of the present disclosure.

Referring now to FIG. 6, a dataflow diagram illustrates various embodiments of a particulate filter preparation system that may be embedded within the control module 44. Various embodiments of particulate filter preparation systems according to the present disclosure may include any number of sub-modules embedded within the control module 44. As can be appreciated, the sub-modules shown in FIG. 6 may be combined and/or further partitioned to similarly control regeneration of the PF 34. Inputs to the system may be sensed from the vehicle 10 (FIG. 1), received from other control modules (not shown) within the vehicle 10 (FIG. 1), and/or determined by other sub-modules (not shown) within the control module 44. In various embodiments, the control module 44 of FIG. 6 includes a regeneration control module 80, a fuel control module 82, and a temperature control module 84.

The regeneration control module 80 receives as input a particulate matter level 86 indicating an estimated level of accumulated particulate matter present in the PF 34 (FIG. 1) and an exhaust flow 88. Based on the particulate matter level 86 and the exhaust flow 88, the regeneration control module 80 determines whether regeneration is desired. For example, if the accumulated particulate matter level 86 is high and the exhaust flow 88 is sufficient to carry the combustion, the regeneration control module 80 determines that regeneration is desired. If regeneration is desired, the regeneration control module 80 sets a regeneration status 90 to indicate that regeneration is desired. In various embodiments, the regeneration status 90 can be an enumeration that includes values for representing at least 'regeneration not desired,' 'regeneration desired,' and 'regeneration in progress.'

The regeneration control module 80 can also receive as input a fuel status 92 and a combustion temperature 93. Once the fuel status 92 indicates that fuel pretreatment is complete (as will be discussed below), the regeneration control module 80 generates a heater control signal 94 that controls current to the PF 34 (FIG. 1) to heat the face of the PF 34 (FIG. 1) and the regeneration status 90 is set to indicate that regeneration is in progress. Once regeneration is complete for example, when the combustion temperature 93 indicates regeneration is complete, the regeneration control module 80, sets the regeneration status 90 to indicate that regeneration is complete.

The fuel control module 82 receives as input the regeneration status 90. If the regeneration status 90 indicates that regeneration is desired, the fuel control module 82 generates a fuel control signal 95 to pretreat the PF 34 (FIG. 1) by controlling the injection of fuel into the exhaust stream or directly into the PF 34 (FIG. 1). Once the fuel pretreatment is complete, the fuel control module 82 sets the fuel status 92 to indicate that the fuel pretreatment is complete. For example, the fuel status 92 is set equal to TRUE when the fuel pretreatment is complete and the fuel status 92 is set equal to FALSE when the fuel pretreatment is not complete.

The temperature control module 84 receives as input the regeneration status 90, an oxygen level 96, an exhaust flow 98, an exhaust temperature 100, and a grid temperature 102. In various embodiments, the grid temperature 102 is determined based on the voltage and/or current signal. When the regeneration status 90 indicates that regeneration is in progress, the temperature control module 84 evaluates the oxygen level 96, the exhaust flow 98, the exhaust temperature 100, and the grid temperature 102 to estimate the combustion temperature 93. If the combustion temperature 93 is too high, the temperature control module 84 controls the fuel and/or the air to the engine 12 (FIG. 1) via fuel parameters 104 and/or air parameters 106 to limit the peak combustion temperature and thus, prevent damage to the PF 34.

Figure 7:
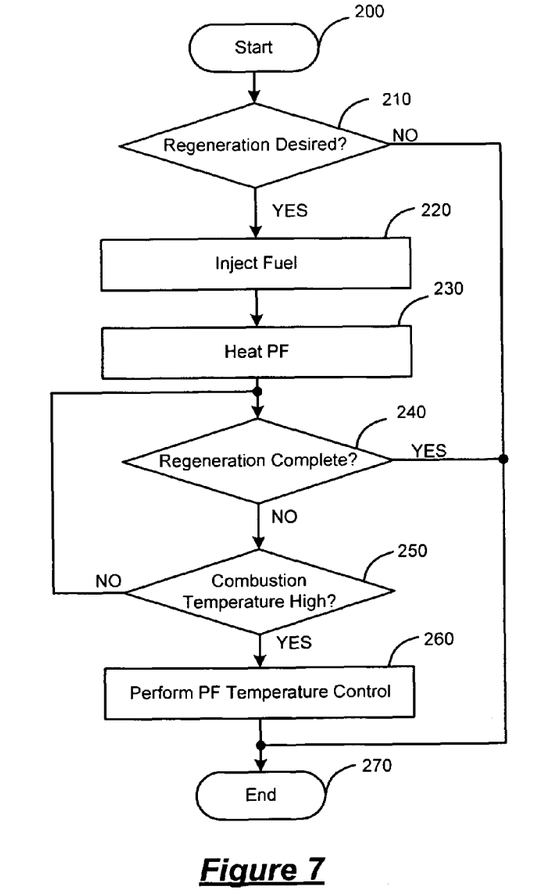
FIG. 7 is a flowchart illustrating an exemplary particulate filter preparation method according to various aspects of the present disclosure.

Referring not to FIG. 7, a flowchart illustrates an exemplary particulate filter preparation method that can be performed by the particulate filter preparation system of FIG. 6 in accordance with various aspects of the present disclosure. As can be appreciated, the order of execution of the steps of the exemplary particulate filter preparation method can vary without altering the spirit of the method. The exemplary particulate filter preparation method may be performed periodically during control module operation or scheduled to run based on certain events.

In one example, the method may begin at 200. The PF 34 (FIG. 1) is evaluated to determine if regeneration is desired at 210. If the PF 34 (FIG. 1) is full and regeneration is desired at 210, the PF 34 (FIG. 1) is pretreated with fuel at 220. Current is applied to PF 34 (FIG. 1) to initiate regeneration at 230. During regeneration at 240, the combustion temperature 93 is monitored at 250. If the combustion temperature 93 is high (i.e. greater than a predetermined threshold) at 250, temperature control is performed to limit the peak temperature of the combustion during regeneration at 260. If, however, the combustion temperature 93 is normal at 150, regeneration continues. After regeneration has completed at 240, the method may end at 270.

Figure 8:
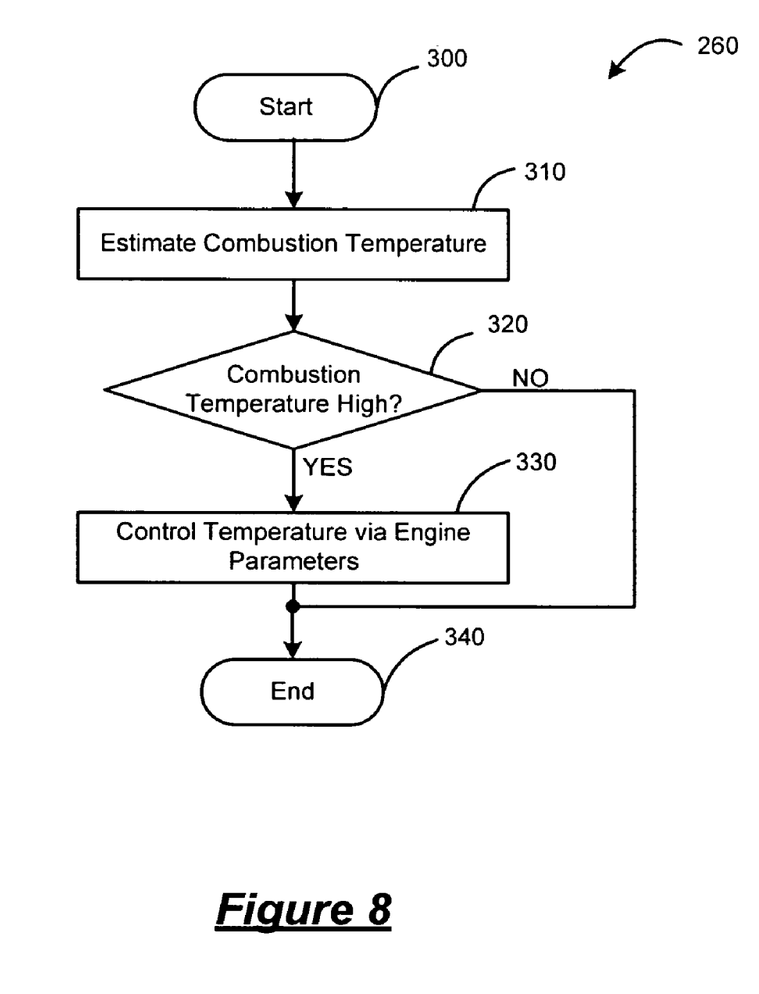
FIG. 8 is a flowchart illustrating an exemplary temperature control method of the particulate filter preparation method according to various aspects of the present disclosure.

Referring now to FIG. 8, a flowchart illustrates an exemplary temperature control method of the particulate filter preparation method that can be performed by the particulate filter preparation system of FIG. 6 in accordance with various aspects of the present disclosure. As can be appreciated, the order of execution of the steps of the exemplary temperature control method can vary without altering the spirit of the method. The exemplary temperature control method may be performed periodically during control module operation or scheduled to run based on certain events.

In one example, the method may begin at 300. The combustion temperature 93 of the particulate matter is estimated at 310 and evaluated at 320. If the combustion temperature 93 is too high (i.e., greater than a threshold) at 320, the combustion temperature 93 is limited at 330 by controlling engine parameters such as, for example, engine air and/or fuel. The method may end at 340.

Those skilled in the art can now appreciate from the foregoing description that the broad teachings of the present disclosure can be implemented in a variety of forms. Therefore, while this disclosure has been described in connection with particular examples thereof, the true scope of the disclosure should not be so limited since other modifications will become apparent to the skilled practitioner upon a study of the drawings, specification, and the following claims.

What is claimed is:

1. A control system that controls regeneration of a particulate filter, comprising:
a regeneration module that selectively indicates that regeneration of the particulate filter is needed;
a fuel control module that delivers unburned fuel to the particulate filter in response to the regeneration module indicating that regeneration is needed and that selectively indicates that the delivery of unburned fuel to the particulate filter is complete,
wherein the regeneration module controls current to a heater to initiate the regeneration in response to the fuel control module indicating that the delivery of unburned fuel to the particulate filter is complete; and
a temperature control module that controls a temperature of the exhaust based on a temperature of combustion of particulate matter in the particulate filter during the regeneration and that estimates the temperature of the combustion of the particulate matter based on a flow of the exhaust, the temperature of the exhaust, a level of oxygen in the exhaust, and a temperature of the particulate filter.

2. The system of claim 1 wherein the regeneration module determines when the regeneration is desired based on a flow of the exhaust and a level of particulate matter in the particulate filter.

3. The system of claim 1 wherein the temperature control module controls the temperature of the exhaust based on adjusting at least one of engine fuel and engine air parameters.

4. The system of claim 1 wherein the regeneration module estimates when the regeneration is complete based on at least one of a flow of the exhaust and a temperature of combustion of particulate matter in the particulate filter.

5. A method of controlling regeneration of a particulate filter, comprising:
selectively indicating that regeneration of the particulate filter is needed;
delivering unburned fuel to the particulate filter in response to the indication that regeneration of the particulate filter is needed;
selectively indicating that the delivery of unburned fuel to the particulate filter is complete;
controlling current to a heater to initiate the regeneration in response to the indication that the delivery of unburned fuel to the particulate filter is complete;
controlling a temperature of the exhaust based on a temperature of combustion of particulate matter in the particulate filter during the regeneration; and
estimating the temperature of the combustion of particulate matter based on a flow of the exhaust, the temperature of the exhaust, a level of oxygen in the exhaust, and a temperature of the particulate filter.

6. The method of claim 5 further comprising determining when the regeneration is desired based on a flow of the exhaust and a level of particulate matter in the particulate filter.

7. The method of claim 5 wherein the controlling the temperature of the exhaust further comprises controlling the temperature of the exhaust based on adjusting at least one of engine fuel and engine air parameters.

8. The method of claim 5 further comprising estimating when the regeneration is complete based on at least one of a flow of the exhaust and a temperature of combustion of particulate matter in the particulate filter.

9. A vehicle, comprising:
a particulate filter that filters particulate matter from engine exhaust wherein an upstream end of the particulate filter receives the engine exhaust;
a grid of electrically resistive material that is applied to an exterior upstream surface of the particulate filter and that selectively heats exhaust passing through the grid to initiate combustion of the particulate matter within the particulate filter; and
a control module that selectively indicates that regeneration of the particulate filter is needed, that delivers unburned fuel to the particulate filter in response to the indication that the regeneration of the particulate filter is needed that selectively indicates that the delivery of unburned fuel to the particulate filter is complete, that controls current to the grid to initiate the regeneration in response to the indication that the delivery of unburned fuel to the particulate filter is complete, that controls a temperature of the engine exhaust based on a temperature of the combustion of the particulate matter in the particulate filter during the regeneration, and that estimates the temperature of the combustion of the particulate matter based on a flow of the engine exhaust, the temperature of the engine exhaust, a level of oxygen in the engine exhaust, and a temperature of the grid.

10. The vehicle of claim 9 wherein the control module determines when the regeneration is desired based on a flow of the engine exhaust and a level of the particulate matter in the particulate filter.

11. The vehicle of claim 9 wherein the control module controls the temperature of the exhaust based on adjusting at least one of engine fuel and engine air parameters.

12. The vehicle of claim 9 wherein the control module estimates when the regeneration is complete based on at least one of a flow of the engine exhaust and a temperature of the combustion of the particulate matter in the particulate filter.

* * * * *